United States Patent [19]
Worden

[11] 3,890,736
[45] June 24, 1975

[54] ACTION-SHAFT FISH LURE MOUNT

[76] Inventor: R. B. Worden, P.O. Box 384, Granger, Wash. 98932

[22] Filed: May 1, 1974

[21] Appl. No.: 465,873

[52] U.S. Cl. ............................. 43/42.11; 43/42.36
[51] Int. Cl. ........................................... A01k 85/00
[58] Field of Search ..... 43/42.21, 43.2, 44.2, 42.74, 43/42.11, 42.13, 42.36, 43.13, 42.19, 42.2

[56] References Cited
UNITED STATES PATENTS

| | | | |
|---|---|---|---|
| 801,649 | 10/1905 | Coffin | 43/44.2 |
| 1,566,812 | 12/1925 | Bayer | 43/42.2 |
| 2,437,549 | 3/1948 | Pecher | 43/42.36 |
| 3,494,063 | 2/1970 | Treaster | 43/42.14 |
| 3,546,804 | 12/1970 | Woolums | 43/42.11 |

Primary Examiner—Warner H. Camp
Attorney, Agent, or Firm—Seed, Berry, Vernon & Baynham

[57] ABSTRACT

A fish lure mount including an action shaft that is rigidly secured to a main body shaft and which extends downwardly from the main body shaft only a slight distance and is of a substantially shorter length than the main body shaft. The main body shaft is provided with a wire coil that holds the main body shaft and action shaft rigidly together. A bead on the main body shaft abuts the wire coil and a floatable lure body abuts the bead. A hook is secured to the rearward end of the main body shaft. The forward and rearward ends of the main body shaft and the rearward end of the action shaft are all provided with loops that are aligned in a single plane.

5 Claims, 5 Drawing Figures

FIG. 1
FIG. 2
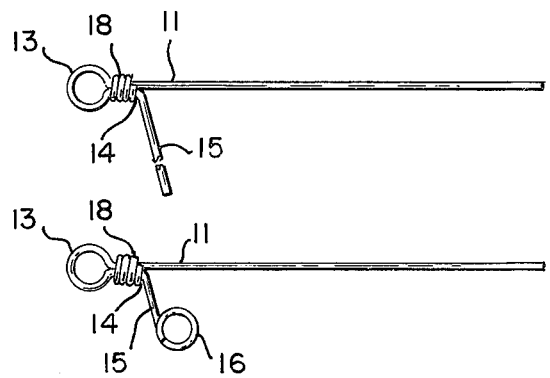
FIG. 3
FIG. 4
FIG. 5
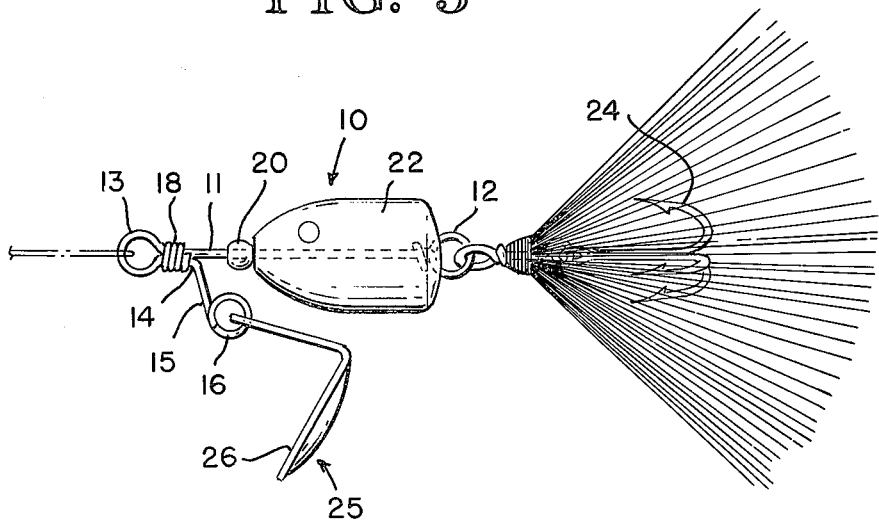

ACTION-SHAFT FISH LURE MOUNT

BACKGROUND OF THE INVENTION

1. Field of the Invention

This invention pertains to fishing lures and mounts for fishing lures of the type in which a distinct wiggling and swimming action is developed.

2. Description of the Prior Art

As is well known, many types of lures are presently on the market. Many of these lures have proven fish-attracting abilities, frequently from simulating a particular motion of the entire lure as the lure moves through the water. Other lures rely on a separate attachment, such as a spinner, for attracting the fish. An example of the latter is shown in U.S. Pat. No. 3,012,356, which uses heavy metal bushings to pull the lure relatively straight in the water and obtains attraction by a rotating spinner 32 rather than wiggling movement of the entire lure.

SUMMARY OF THE INVENTION

It is an object of this invention to provide a lure having a distinctive, fish attracting, wiggling motion.

It is another object of this invention to provide a mount for a fishing lure which has a distinctive action different from that of similar type lures.

Basically these objects are obtained by providing a main body shaft having forward and rearward ends with loops on the ends aligned in a common plane. An action shaft of a substantially shorter length than the main body shaft is formed at the forward end of the main body shaft and extends downwardly therefrom at a sharp angle and terminates in a third or action loop approximately one-eighth to one-fourth of an inch below the main body shaft. An action plate is secured on the action loop for giving the lure a distinct wiggling and swimming action. A floating member is mounted on the main body shaft to give the lure mount buoyancy. Ornamentation, such as a bead or a distinctly colored lure body, can be added to the main body shaft rearward of the action shaft, and a hook can be secured to the rearward loop of the main body shaft to convert the mount into a finished lure. The main body shaft and the action shaft are joined by a short coil of wire to give a rigid interconnection between the two.

Various numbers of beads and shapes of buoyant lure bodies can be applied. The action plate is preferably a bent blade having a concavo-convex surface. Suitable buoyant lure bodies are: cork, wood, plastic, air foam, hair or bucktail. Also, leads can be attached to the rearward loop on the main body shaft and be connected to additional flies, spinners or snelled hooks.

BRIEF DESCRIPTION OF THE DRAWINGS

FIGS. 1–4 are sequential operational views illustrating the technique for forming a lure mount having a main body shaft and an action shaft according to the principles of the invention.

FIG. 5 is a side elevation of one form of lure constructed in its final form.

DETAILED DESCRIPTION OF THE PREFERRED EMBODIMENTS

The fish lure mount 10 includes a main body shaft 11 having a rearward loop 12 and a forward loop 13 lying in a common plane. The forward end of the main body shaft 11 is formed with a sharp downward bend 14 to form an action shaft 15 having a third or action loop 16. The action loop 16 lies in the same plane as the forward and rearward loops 13 and 12 of the main body shaft. The action shaft is substantially shorter than the main body shaft, approximately one-fifth the length, and extends downwardly therefrom a very short distance, approximately one-eighth to one-fourth of an inch. The action shaft is rigidly joined to the main body shaft by a short wire coil 18.

Preferably, the loops are all split in a conventional manner to allow the insertion of hooks, blades, etc.

Various types of buoyant lures can be added to the main body shaft, one of the most effective being a single bead 20 and a lightweight plastic, painted lure body 22. A hook 24 can be secured, of course, to the rearward loop 12.

Fastened in the action loop 16 is a bent blade 25 having a concave-convex end 26 with the concave portion of the blade facing the forward end of the main body shaft.

The shortness of the action shaft and its close proximity to the main body shaft, coupled with the curvature of the bent blade, give the lure a distinctive swimming and wiggling action not found in any known fishing lures.

While the parts of the invention described above are important, variations will be apparent to one skilled in the art without departing from the principles incorporated therein. For example, the important features of the invention form parts of a lure mount on which various types of attractants can be added to produce a finished lure. Basically, the lure mount itself, however, requires only the main body shaft with in-line forward and rearward loops, a rigidly coupled action shaft extending below the main body shaft for only a short distance and with an additional in-line loop, a bent concavoconvex blade on the loop of the action shaft, and a buoyant body on the main body shaft. These features give any lure, after completion, a distinct wiggling action near the surface of the water. Accordingly, the invention is not to be limited to the specific embodiment illustrated.

The embodiments of the invention in which a particular property or privilege is claimed are defined as follows:

1. A fishing lure mount having a main body shaft of elongated wire and provided with forward and rearward loops lying in a common plane, an action shaft integrally connected to the main body shaft close behind said forward loop, said action shaft extending downwardly at a sharp angle from said main body shaft and terminating in an action loop, said action loop lying in the same plane as said forward and rearward loops, said action shaft having a relatively short length compared to said main body shaft so that the action loop lies close to said forward loop of said main body shaft, a bent blade connected to said action loop for limited oscillating movement whereby the bent blade transmits to the forward end of the lure mount a wiggling motion similar to that of a minnow wiggling, a buoyant lure body on said main body shaft rearward of said action shaft, and means for hooking a fish coupled to said rearward loop.

2. The lure mount of claim 1, said action shaft being approximately 1/5 the length of the main body shaft.

3. The lure mount of claim 1, said main body shaft and said action shaft being joined and held in alignment by a short wire coil.

4. The lure mount of claim 3, said main body shaft including a bead positioned between said wire coil and said lure body.

5. The lure mount of claim 1, said means for hooking a fish including a metal fish hook.

* * * * *